United States Patent
Chen

(10) Patent No.: US 11,518,547 B1
(45) Date of Patent: Dec. 6, 2022

(54) BOOSTER SYSTEM FOR LAUNCH VEHICLE

(71) Applicant: AT SPACE PTY LTD, North Adelaide (AU)

(72) Inventor: Yen-Sen Chen, North Adelaide (AU)

(73) Assignee: AT SPACE PTY LTD, North Adelaide (AU)

( * ) Notice: Subject to any disclaimer, the term of this patent is extended or adjusted under 35 U.S.C. 154(b) by 56 days.

(21) Appl. No.: 17/351,239

(22) Filed: Jun. 18, 2021

(51) Int. Cl.
*B64G 1/40* (2006.01)
*B64G 1/00* (2006.01)

(52) U.S. Cl.
CPC ............... *B64G 1/002* (2013.01); *B64G 1/40* (2013.01)

(58) Field of Classification Search
CPC .......... B64G 1/002; B64G 1/40; B64G 1/401; B64G 1/403; B64G 1/404
See application file for complete search history.

(56) References Cited

U.S. PATENT DOCUMENTS

| | | | | |
|---|---|---|---|---|
| 3,202,381 A | * | 8/1965 | Wuenscher | F42B 15/36 244/159.3 |
| 4,796,839 A | * | 1/1989 | Davis | B64G 1/402 244/171.3 |
| 5,217,188 A | * | 6/1993 | Thole | B64G 1/403 244/171.6 |
| 6,581,881 B2 | * | 6/2003 | Kiselev | B64G 1/404 244/158.4 |
| 6,769,651 B2 | * | 8/2004 | Kiselev | B64G 1/404 244/171.1 |
| 8,729,443 B2 | * | 5/2014 | Facciano | B64G 1/002 701/4 |
| 9,457,918 B2 | * | 10/2016 | Hand | B64G 1/62 |
| 2017/0349301 A1 | * | 12/2017 | Bezos | B64G 1/26 |

* cited by examiner

*Primary Examiner* — Brian M O'Hara
(74) *Attorney, Agent, or Firm* — Bruce Stone LLP; Joseph A. Bruce

(57) ABSTRACT

A booster system for a launch vehicle includes a plurality of core boosters and a plurality of patchy boosters. The plurality of core boosters and the plurality of patchy boosters are arranged in an inner space of a rocket casing of the launch vehicle, and the plurality of patchy boosters is separatable from the launch vehicle.

18 Claims, 3 Drawing Sheets

BOOSTER SYSTEM FOR LAUNCH VEHICLE

BACKGROUND

Field of the Invention

The present invention relates to an engine system, and more particularly to a booster system for launch vehicles.

Description of Related Art

Small launch vehicles are designed to provide space launch services with the aim of responsive and dedicated satellite payload missions. To fulfill launch capability requirements for heavier payloads and/or higher orbits, most launch vehicle designers may turn to the variation of strapped-on boosters at the booster stage. However, the strapped-on boosters has the problem of increased complexity of the vehicle's external geometry which cause increased aerodynamic losses during the ascend phase of the launch which is in the dense part of the atmosphere.

SUMMARY

One objective of the present invention is to provide a booster system for a launch vehicle, and the booster system replaces such strapped-on boosters by patchy boosters disposed internally so that the cross section of the booster stage of the launch vehicle can have the same or similar shape as the cross section of the rocket casing.

Another objective of the present invention is to provide a booster system for a launch vehicle, and the booster system is capable of enhancing the structural integrity of the booster stage as well as reducing the complexity of the vehicle's external geometry.

Yet another objective of the present invention is to provide a booster system for a launch vehicle, and the booster system is capable of reducing aerodynamic loss during the ascend phase of the launch which is in the dense part of the atmosphere.

To achieve these or more objectives, the present invention provides a booster system for a launch vehicle according to one embodiment, and the booster system includes a plurality of core boosters and a plurality of patchy boosters. The plurality of core boosters and the plurality of patchy boosters are arranged in an inner space of a rocket casing of the launch vehicle, and the plurality of patchy boosters is separatable from the launch vehicle.

In some embodiments, one patchy booster of the plurality of patchy boosters is located between adjacent two of the plurality of core boosters.

In some embodiments, one core booster of the plurality of core boosters is located between adjacent two of the plurality of patchy boosters.

In some embodiments, the plurality of patchy boosters is located around (or surrounds) one core booster of the plurality of core boosters.

In some embodiments, the plurality of core boosters is located around (or surrounds) one patchy booster of the plurality of patchy boosters.

In some embodiments, an amount of the plurality of core boosters is five, an amount of the plurality of patchy boosters is four, central axes of first, second and third core boosters of the five core boosters are aligned in a first axis, central axes of fourth and fifth core boosters of the five core boosters and the central axis of the first core booster are aligned in a second axis, central axes of two of the four patchy boosters are aligned in a third axis, central axes of the other ones of the four patchy boosters are aligned in a fourth axis, and the first, second, third and fourth axes intersect each other.

In some embodiments, an amount of the plurality of core boosters is four, an amount of the plurality of patchy boosters is five, the four core boosters surround a first patchy booster of the five patchy boosters, central axes of two of the four core boosters are aligned in a first axis, central axes of the other ones of the four core boosters are aligned in a second axis, central axes of second and third patchy boosters of the five patchy boosters and the central axis of the first patchy booster are aligned in a third axis, central axes of the other ones of the five patchy boosters and the central axis of the first patchy booster are aligned in a fourth axis, and the first, second, third and fourth axes intersect each other.

In some embodiments, an amount of the plurality of core boosters is three, an amount of the plurality of patchy boosters is three, central axes of the three core boosters aim at vertices of a first triangle, central axes of the three patchy boosters aim at vertices of a second triangle overlapping the first triangle.

In some embodiments, an amount of the plurality of core boosters is two, an amount of the plurality of patchy boosters is two, central axes of the two core boosters are aligned in a ninth axis, and central axes of the two patchy boosters are aligned in a tenth axis intersecting the ninth axis.

In some embodiments, the rocket casing is cylindrical.

BRIEF DESCRIPTION OF THE DRAWINGS

After studying the detailed description in conjunction with the following drawings, other aspects and advantages of the present invention will be discovered.

DETAILED DESCRIPTION

Figure 2:
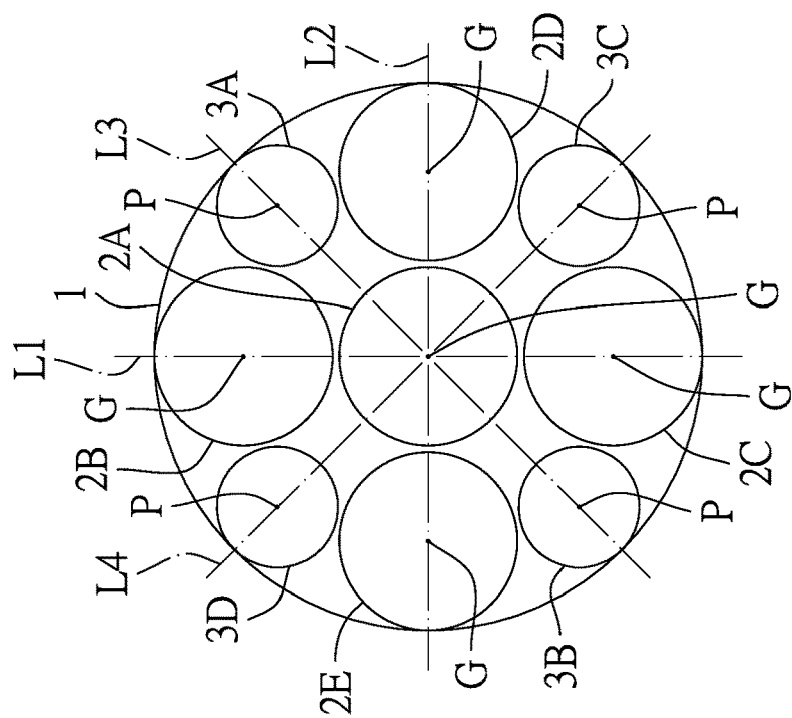
FIG. 2 is a schematic diagram of the booster stage at another view point according to an embodiment of the present invention, to show five core boosters and four patchy boosters in the booster system thereof.
Figure 1:
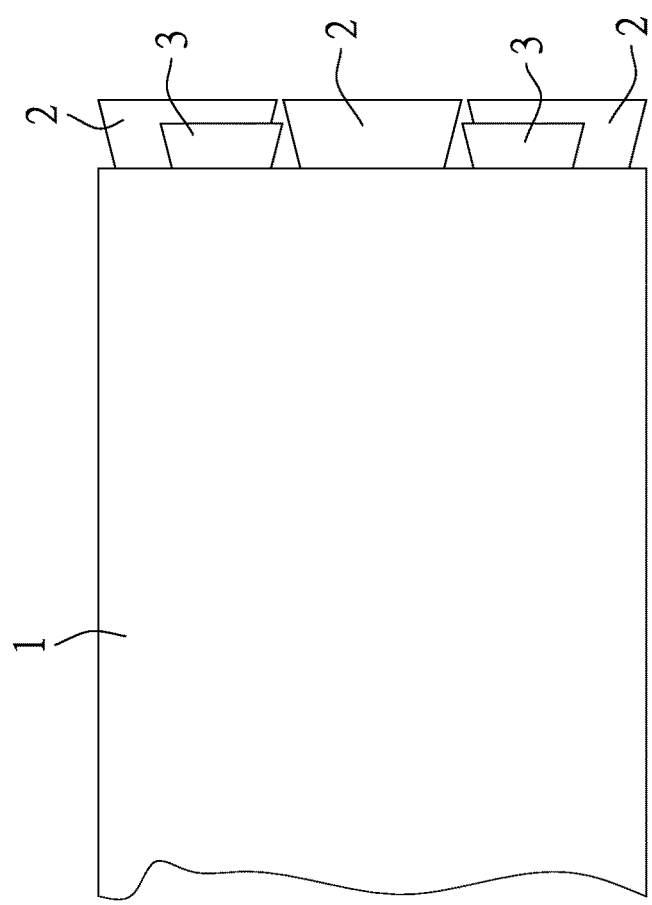
FIG. 1 is a schematic diagram of a booster stage of a launch vehicle at a view point according to an embodiment of the present invention.

Please refer to FIGS. 1 and 2, illustrating a booster stage of a launch vehicle according to an embodiment of the present invention. The booster stage includes a booster system including a plurality of core boosters 2 and a plurality of patchy boosters 3. The radial size of the respective patchy booster 3 is smaller than the radial size of the respective core booster 2. All the core boosters 2 and the patchy boosters 3 are disposed in an inner space of a rocket casing 1 of the launch vehicle, resulting in a cylindrical cross section of the whole booster stage. Therefore, the overall aerodynamics characteristic is possibly maintained throughout the ascending phase of the flight in the dense part of the atmosphere from the ground through vehicle acceleration and maximum dynamic pressure regime. After that, the plurality of patchy boosters 3 can be separated from the launch vehicle when the launch vehicle reaches the low-density high altitude.

In the embodiment shown in FIG. 2, there are five core boosters 2 and four patchy boosters 3 in the inner space of the rocket casing 1, i.e., first to fifth core boosters 2A to 2E and first to fourth patchy boosters 3A to 3D. The central axes G of the first, second and third core boosters 2A to 2C are aligned in a first axis L1, and the central axes G of the first, fourth and fifth core boosters 2A, 2D and 2E are aligned in a second axis L2. The central axes P of the first and second patchy boosters 3A and 3B are aligned in a third axis L3, and the central axes P of the third and fourth patchy boosters 3C and 3D are aligned in a fourth axis L4. The first to fourth axes L1 to L4 intersect each other at the central axis G of the first core booster 2A. Preferably, the first axis L1 is substantially perpendicular to the second axis L2, and the third axis L3 is substantially perpendicular to the fourth axis L4. More preferably, an angle between the first and fourth axes L1 and L4 and an angle between the first and third axes L1 and L3 are about 45 degrees, and an angle between the second and third axes L2 and L3 and an angle between the second and fourth axes L2 and L4 are about 45 degrees.

The first core booster 2A is surrounded by the second to fifth core boosters 2B to 2E and the first to fourth patchy boosters 3A to 3D, and the second to fifth core boosters 2B to 2E and the first to fourth patchy boosters 3A to 3D are alternately positioned around (or surround) the first core booster 2A. The second core booster 2B is located between the first and fourth patchy boosters 3A and 3D, the third core booster 2C is located between the second and third patchy boosters 3B and 3C, the fourth core booster 2D is located between the first and third patchy boosters 3A and 3C, and the fifth core booster 2E is located between the second and fourth patchy boosters 3B and 3D.

However, the present invention is not limited to the configuration of the core and patchy boosters 2 and 3 and the amount of core boosters 2 and the number of patchy boosters 3 in the configuration in the foregoing embodiment shown in FIG. 2. Other configurations of the core and patchy boosters 2 and 3, different amounts of core boosters 2 and different amounts of patchy boosters 3 may also be contemplated in other embodiments, and these other embodiments are exemplarily explained as follows.

Figure 3:
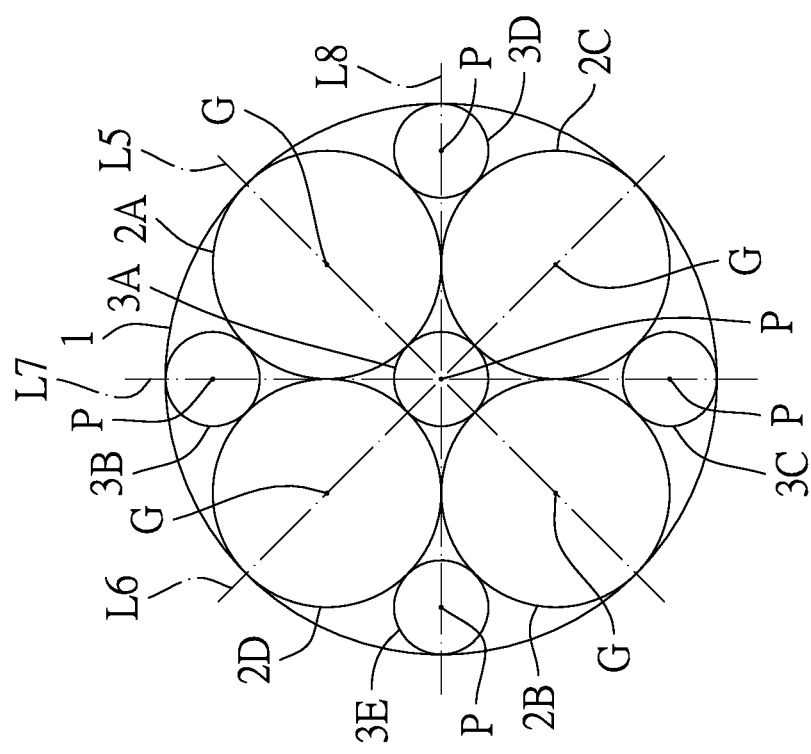
FIG. 3 is a schematic diagram of the booster stage at another view point according to an embodiment of the present invention, to show four core boosters and five patchy boosters in the booster system thereof.

Please refer to FIG. 3, illustrating another embodiment of the booster stage. In the drawing, four core boosters 2 and five patchy boosters 3 are positioned in the inner space of the rocket casing 1, namely first to fourth core boosters 2A to 2D and first to fifth patchy boosters 3A to 3E. The central axes G of the first and second core boosters 2A and 2B and the central axis of the first patchy booster 3A are aligned in a first axis L5, and the central axes G of the third and fourth core boosters 2C and 2D and the central axis of the first patchy booster 3A are aligned in a second axis L6. The central axes P of the first to third patchy boosters 3A to 3C are aligned in a third axis L7, and the central axes P of the first, fourth and fifth patchy boosters 3A, 3D and 3E are aligned in a fourth axis L8. The first to fourth axes L5 to L8 intersect each other at the central axis P of the first patchy booster 3A. Preferably, the first axis L5 is substantially perpendicular to the second axis L6, and the third axis L7 is substantially perpendicular to the fourth axis L8. More preferably, an angle between the first and third axes L5 and L7 and an angle between the first and fourth axes L5 and L8 are about 45 degrees, an angle between the second and third axes L6 and L7 and an angle between the second and fourth axes L6 and L8 are about 45 degrees.

The first to fourth core boosters 2A to 2D surround the first patchy booster 3A, and the second to fifth patchy boosters 3B to 3E also surround the first patchy booster 3A. The first core booster 2A is located between the second and fourth patchy boosters 3B and 3D, the second core booster 2B is located between the third and fifth patchy boosters 3C and 3E, the third core booster 2C is located between the third and fourth patchy boosters 3C and 3D, and the fourth core booster 2D is located between the second and fifth patchy boosters 3B and 3E.

Figure 4:
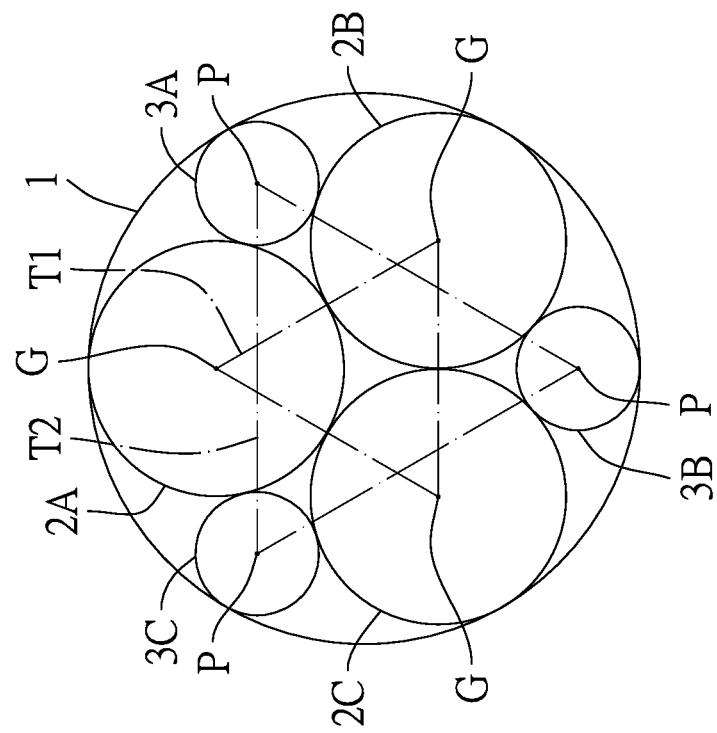
FIG. 4 is a schematic diagram of the booster stage at another view point according to an embodiment of the present invention, to show three core boosters and three patchy boosters in the booster system thereof.

Please refer to FIG. 4, illustrating yet another embodiment of the booster stage. Three core boosters 2 and three patchy boosters 3 are disposed in the inner space of the rocket casing 1, namely first to third core boosters 2A to 2C and first to third patchy boosters 3A to 3C. The central axes G of the first to third core boosters 2A to 2C aim at the three vertices of a first triangle T1, and the central axes P of the first to third patchy boosters 3A to 3C aim at the three vertices of a second triangle T2 overlapping the first triangle T1. Preferably, the first and second triangle T1 and T2 are equilateral triangles. More preferably, centroids of the first and second triangle T1 and T2 coincide at the central axis of the rocket casing 1.

The first core booster 2A is located between the first and third patchy boosters 3A and 3C, the second core booster 2B is located between the first and second patchy boosters 3A and 3B, and the third core booster 2C is located between the second and third patchy boosters 3B and 3C.

Figure 5:
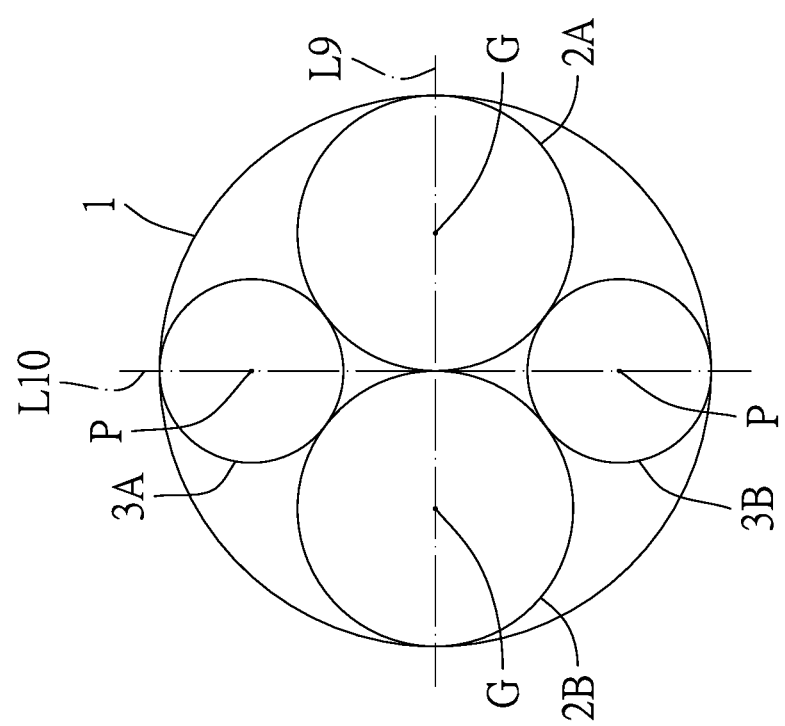
FIG. 5 is a schematic diagram of the booster stage at another view point according to an embodiment of the present invention, to show two core boosters and two patchy boosters in the booster system thereof.

Please refer to FIG. 5, illustrating yet another embodiment of the booster stage. Two core boosters 2 and two patchy boosters 3 are located in the inner space of the rocket casing 1, namely first and second core boosters 2A and 2B and first and second patchy boosters 3A and 3B. The central axes G of the first and second core boosters 2A and 2B are aligned in a ninth axis L9, and the central axes P of the first and second patchy boosters 3A and 3B are aligned in a tenth axis L10 intersecting the ninth axis L9. Preferably, the ninth axis L9 is substantially perpendicular to the tenth axis L10.

Although the configurations of the core and patchy boosters 2 and 3 and the amount of core boosters 2 and the number of patchy boosters 3 in the respective configuration are exemplarily illustrated in FIGS. 2 to 5, more or less patchy boosters 3 paired with the same number of core boosters 2 may also be contemplated in some embodiments.

While we have shown and described various embodiments in accordance with the present invention, it is clear to those skilled in the art that further embodiments may be made without departing from the scope of the present invention.

What is claimed is:

1. A booster system for a launch vehicle, comprising:
a plurality of core boosters and a plurality of patchy boosters, arranged in an inner space of a rocket casing of the launch vehicle, wherein the plurality of patchy boosters is separatable from the launch vehicle,
wherein an amount of the plurality of core boosters is five, an amount of the plurality of patchy boosters is four, central axes of first, second and third core boosters of the five core boosters are aligned in a first axis, central axes of fourth and fifth core boosters of the five core boosters and the central axis of the first core booster are aligned in a second axis, central axes of two of the four patchy boosters are aligned in a third axis, central axes of the other ones of the four patchy boosters are aligned in a fourth axis, and the first, second, third and fourth axes intersect each other.

2. The booster system according to claim 1, wherein one patchy booster of the plurality of patchy boosters is located between two adjacent core boosters of the plurality of core boosters.

3. The booster system according to claim 1, wherein one core booster of the plurality of core boosters is located between two adjacent patchy boosters of the plurality of patchy boosters.

4. The booster system according to claim 1, wherein the plurality of patchy boosters surrounds one core booster of the plurality of core boosters.

5. The booster system according to claim 1, wherein the plurality of core boosters surrounds one patchy booster of the plurality of patchy boosters.

6. A booster system for a launch vehicle, comprising:
a plurality of core boosters and a plurality of patchy boosters, arranged in an inner space of a rocket casing of the launch vehicle, wherein the plurality of patchy boosters is separatable from the launch vehicle,
wherein an amount of the plurality of core boosters is four, an amount of the plurality of patchy boosters is five, the four core boosters surround a first patchy booster of the five patchy boosters, central axes of two of the four core boosters are aligned in a first axis, central axes of the other ones of the four core boosters are aligned in a second axis, central axes of second and third patchy boosters of the five patchy boosters and the central axis of the first patchy booster are aligned in a third axis, central axes of the other ones of the five patchy boosters and the central axis of the first patchy booster are aligned in a fourth axis, and the first, second, third and fourth axes intersect each other.

7. A booster system for a launch vehicle, comprising:
a plurality of core boosters and a plurality of patchy boosters, arranged in an inner space of a rocket casing of the launch vehicle, wherein the plurality of patchy boosters is separatable from the launch vehicle,
wherein an amount of the plurality of core boosters is three, an amount of the plurality of patchy boosters is three, central axes of the three core boosters are at vertices of a first triangle, central axes of the three patchy boosters are at vertices of a second triangle overlapping the first triangle.

8. The booster system according to claim 1, wherein the rocket casing is cylindrical.

9. The booster system according to claim 1, wherein a radial size of each of the plurality of patchy boosters is smaller than a radial size of each of the plurality of core boosters.

10. The booster system according to claim 6, wherein one patchy booster of the plurality of patchy boosters is located between two adjacent core boosters of the plurality of core boosters.

11. The booster system according to claim 6, wherein one core booster of the plurality of core boosters is located between two adjacent patchy boosters of the plurality of patchy boosters.

12. The booster system according to claim 6, wherein the rocket casing is cylindrical.

13. The booster system according to claim 6, wherein one patchy booster of the plurality of patchy boosters is surrounded by the other patchy boosters of the plurality of patchy boosters.

14. The booster system according to claim 6, wherein a radial size of each of the plurality of patchy boosters is smaller than a radial size of each of the plurality of core boosters.

15. The booster system according to claim 7, wherein one patchy booster of the plurality of patchy boosters is located between two adjacent core boosters of the plurality of core boosters.

16. The booster system according to claim 7, wherein one core booster of the plurality of core boosters is located between two adjacent patchy boosters of the plurality of patchy boosters.

17. The booster system according to claim 7, wherein the rocket casing is cylindrical.

18. The booster system according to claim 7, wherein a radial size of each of the plurality of patchy boosters is smaller than a radial size of each of the plurality of core boosters.

* * * * *